(12) United States Patent
Adolph et al.

(10) Patent No.: US 6,397,310 B1
(45) Date of Patent: May 28, 2002

(54) METHOD AND APPARATUS FOR CONTROLLING WRITE ACCESS TO STORAGE MEANS FOR A DIGITAL DATA PROCESSING CIRCUIT

(75) Inventors: Dirk Adolph, Ronnenberg; Harald Schiller, Hannover, both of (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/301,999

(22) Filed: Apr. 29, 1999

(30) Foreign Application Priority Data

Apr. 30, 1998  (EP) ............................................. 98250147

(51) Int. Cl.⁷ .............................................. G06F 9/305
(52) U.S. Cl. .................... 711/163; 147/148; 147/149; 147/150; 147/151; 147/152; 713/36
(58) Field of Search ......................... 711/147–152, 163, 711/164; 712/217–219, 225; 713/36

(56) References Cited

U.S. PATENT DOCUMENTS

| | | | |
|---|---|---|---|
| 5,390,333 A | * | 2/1995 | Pritt et al. .................. 713/324 |
| 5,421,006 A | | 5/1995 | Jablon et al. .................. 714/36 |
| 5,655,105 A | * | 8/1997 | McLaury ...................... 711/169 |
| 5,737,744 A | * | 4/1998 | Callison et al. ............. 711/114 |
| 5,793,688 A | * | 8/1998 | McLaury ...................... 365/203 |

FOREIGN PATENT DOCUMENTS

| | | |
|---|---|---|
| GB | 2222899 A | 3/1990 |
| WO | WO 96/38775 | 12/1996 |

* cited by examiner

*Primary Examiner*—Than Nguyen
(74) *Attorney, Agent, or Firm*—Joseph S. Tripoli; Robert D. Shedd

(57) ABSTRACT

The typical operation of AV processing ICs includes an initialisation mode wherein registers are set up according to the desired functionality using dedicated set up software, and a normal decoding mode in which the content of the registers will not be changed any more. Often the initialisation mode software leads to un-initialised pointers and addresses for the registers. The writing of data in case of invalid pointers or address values can be avoided by additional small hardware for the register write access logic which enables or disables a write enable signal for distinct periods of time.

6 Claims, 1 Drawing Sheet

METHOD AND APPARATUS FOR CONTROLLING WRITE ACCESS TO STORAGE MEANS FOR A DIGITAL DATA PROCESSING CIRCUIT

FIELD OF THE INVENTION

The invention relates to a method and to an apparatus for controlling write access to storage means for a digital data processing circuit.

BACKGROUND OF THE INVENTION

Integrated circuits (IC) for digital audio and/or video data (AV) processing typically contain several sub-units which must be configured by set-up software before they can operate in one or several modes of operation.

The microcontroller for the set up and control of the sub-units can either be an external one in a separate IC, or, on some AV ICs, it will be integrated as an internal CPU core.

SUMMARY OF THE INVENTION

The software to run on such AV ICs may contain imperfections for several reasons like:
  During the software development phase when implementation and debugging is not yet complete.
  Even for product software, testing can not be extensive, i.e. can not cover 100% of all possible situations, as a matter of sheer complexity.
  The AV IC may be operated in an environment where foreign, i.e. uncontrollable software is downloaded and runs on the IC.

A very frequent bug in developing driver software to run on AV decoder ICs is caused by un-initialised pointers and addresses. Such bugs have severe consequences at runtime. Amongst the worst of these is the inadvertent writing to device set-up registers which are typically memory-mapped into the general address space of the IC.

Adding debug software for monitoring un-initialised pointers and addresses will typically slow down the software performance to such an extent that this is no longer representative for the real-time behaviour of the IC. Also, typically, such monitoring debug software does give no indication on who generated the illegal or unintended register access. The typical operation of AV processing ICs has distinct phases or modes, where 1) in an initialisation phase or mode registers are set up according to the desired functionality using dedicated set up software;
2) in a normal decoding phase or mode the content of all or parts of these registers will not be changed any more; the values they hold will merely govern the decoding and data processing that is carried out within the IC.

In both kind of modes it may happen that the IC is operated with downloaded foreign software which has write access to such registers into which the original software would not write or concerning which the original software assumes in the normal decoding mode to contain certain original values.

It is one object of the invention to disclose a method preventing, when running application software, the writing of data in case of invalid pointers or address values and for indicating the source of an illegal or unintended address value.

It is a further object of the invention to disclose an apparatus which utilises the inventive method.

The invention concerns a hardware addition to the register write access logic, by which write accesses can be deliberately allowed (enabled) or disallowed (disabled) for distinct periods of time.

Advantageously this additional hardware can be very small and cheap. The output of a CPU controlled 1-bit RegisterWriteAllowed register is combined in an AND function with the normal WriteEnable signal in order to form a ProtectedWriteEnable signal for the subsequent data storage means to be controlled. There may be two additional CPU commands for setting and resetting the RegisterWriteAllowed register.

Since typically both above mentioned operation phases exist, write allowance will have to change only rarely, hence real-time performance is deteriorated only neglectably.

In addition to blocking any write processes, an extended version of the inventive add-on hardware can be incorporated such as to trigger an interrupt, which can signal that an illegal write attempt has occurred.

In a further embodiment of the invention, in case of such interrupt, the address of the current CPU command is captured into a dedicated register, which allows to retrieve who, i.e. which part of the application software, generated the unintended register access.

In principle, the inventive method is suited for controlling write access to storage means for a digital data processing circuit which can be operated in an initialisation mode before operating in a normal processing mode, wherein in order to avoid the use of invalid or un-intended address values or pointers for said storage means during said normal processing mode, at least one write enable signal is conditionally passed to said storage means under the control of an associated RegisterWriteAllowed register output signal, in particular by using an AND function.

In principle the inventive apparatus for controlling write access to storage means for a digital data processing circuit, which can be operated in an initialisation mode before operating in a normal processing mode, includes:
  storage means control means providing at least one read enable signal and at least one write enable signal for said storage means;
  combining means, in particular an AND gate, for conditionally passing said at least one write enable signal to said storage means under the control of an associated RegisterWriteAllowed register output signal in order to avoid the use of invalid or un-intended address values or pointers for said storage means during said normal processing mode.

BRIEF DESCRIPTION OF THE DRAWINGS

Embodiments of the invention are described with reference to the accompanying drawings, which show in.

DETAILED DESCRIPTION OF PREFERRED EMBODIMENTS

Figure 1:
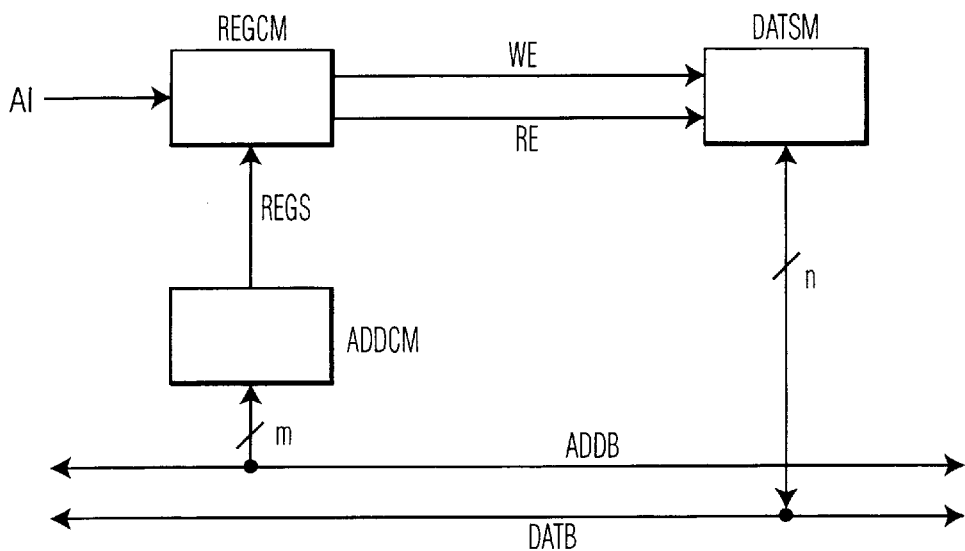
FIG. 1 known data storage control.

Within digital AV ICs the set-up registers and their control logic will typically consist of the means depicted in FIG. 1. Address comparison means ADDCM, which are connected via an m-bit connection to an address bus ADDB, generate a RegisterSelected signal REGS whenever one of the dedicated register addresses appears on the address bus ADDB. Register control means REGCM, which use the REGS signal and additional information AI from the command processing of an internal or external microcontroller, generate therefrom write enable WE and read enable RE signals for data storage means DATSM. DATSM is connected via an n-bit connection to a data bus DATB and embodies e.g. a set-up register memory, the writing into which and reading out of which is controlled by the WE and RE signals. 'n' and 'm' are possibly different integer numbers indicating the width of the address and data bus, respectively.

Figure 2:
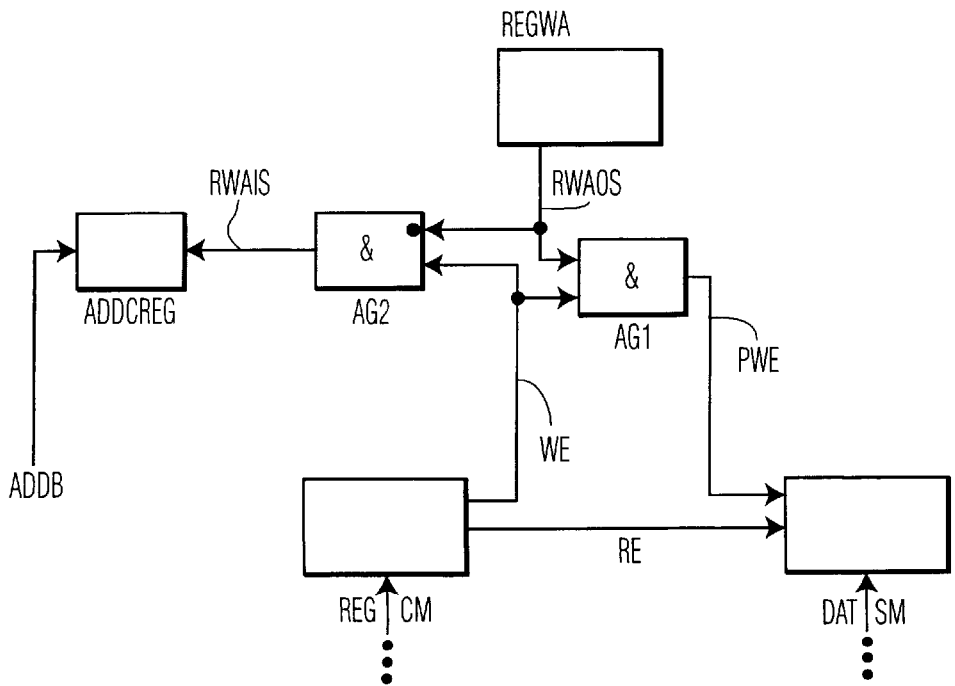
FIG. 2 inventive add-on for data storage write enabling.

In the first inventive embodiment according to FIG. 2, a first AND gate AG1 and an 1-bit RegisterWriteAllowed register REGWA is added. REGCM and DATSM correspond to the blocks of the same name in FIG. 1. Two additional CPU commands allow to set and to reset register REGWA. The first AND gate AG1 combines the write enable signal WE from REGCM with the 1-bit output signal RWAOS of register REGWA into a protected write enable signal PWE which is used instead of WE to control the set-up register/data storage means DATSM.

Optionally a second AND gate AG2, or a corresponding logic hardware function, combines the write enable signal WE and the inverted RegisterWriteAllowed output signal RWAOS into a RegisterWriteAttempt interrupt signal RWAIS. RWAIS indicates that a write attempt has been made in a phase where register writes had been explicitely disallowed.

As a further embodiment an address capturing register ADDCREG which is controlled by the RWAIS signal stores the current CPU command address from the address bus of the external or internal microcontroller whenever the RWAIS interrupt occurs. The ADDCREG register can be read out for debug purposes.

The invention can be used for example in a DVD player or in connection with any other digital processing IC beyond AV processing, which includes the dedicated set-up and normal operation phases as described above.

The initialisation mode can take place when manufacturing a device containing the IC or when e.g. the power of the device or IC is switched on by a user or when the device or IC becomes switched to a different operation mode. Different parts of the complete initialisation mode may be carried out during several of these opportunities.

What is claimed is:

1. Method for controlling write access to a memory of a digital data processing circuit, which circuit can be operated in an initialisation mode before operating in a normal processing mode, comprising the steps:
   combining a write enable signal, in particular by using an AND function, with an associated write allowance register output signal for providing a protected write enable signal for said memory;
   controlling writing of data into said memory in response to said protected write enable signal for avoiding storing into said memory invalid or unintended address values or pointers accidentally available on a common address bus, instead of storing into said memory from said common address bus valid or intended address values or pointers for controlling the operation of said digital data processing circuit during said normal processing mode;
   inverting said write allowance register output signal; and
   combining said write enable signal and the inverted write allowance register output signal, in particular by using a further AND function, to form a write attempt interrupt signal for controlling an address capturing register storing a current invalid or unintended address value or pointer from said common address bus.

2. Method according to claim 1, wherein said write allowance register output signal is provided from a 1-bit write allowance register which is set and reset by a dedicated CPU command.

3. Method for controlling write access to a memory of a digital data processing circuit, which circuit can be operated in an initialisation mode before operating in a normal processing mode, comprising the steps:
   combining a write enable signal, in particular by using an AND function, with an associated write allowance register output signal for providing a protected write enable signal for said memory; and
   controlling writing of data into said memory in response to said protected write enable signal for avoiding storing into said memory invalid or unintended address values or pointers accidentally available on a common address bus, instead of storing into said memory from said common address bus valid or intended address values or pointers for controlling the operation of said digital data processing circuit during said normal processing mode;
   wherein said write allowance register output signal is provided from a 1-bit write allowance register which is set and reset by a dedicated CPU command.

4. Apparatus for controlling write access to a memory of a digital data processing circuit, which circuit can be operated in an initialisation mode before operating in a normal processing mode, comprising:
   a memory for storing from a common address bus valid or intended address values or pointers for controlling the operation of said digital data processing circuit during said normal processing mode; and
   memory control means for providing a protected write enable signal for said memory, wherein said protected write enable signal is conditionally generated by combining a write enable signal, in particular by using an AND function, with an associated write allowance register output signal; and wherein said memory operates in response to said protected write enable signal for avoiding storing into said memory invalid or unintended address values or pointers accidentally available on said common address bus; and further comprising means for inverting the write allowance register output signal, and an address capturing register controlled by a write attempt interrupt signal for storing a current invalid or unintended address value or pointer from said common address bus; said write attempt interrupt signal being generated in response to a combination of said write enable signal and the inverted write allowance register output signal, the combination being provided in particular by using a further AND function.

5. Apparatus for controlling write access to a memory of a digital data processing circuit, which circuit can be operated in an initialisation mode before operating in a normal processing mode, comprising:
   a memory for storing from a common address bus valid or intended address values or pointers for controlling the operation of said digital data processing circuit during said normal processing mode; and
   memory control means for providing a protected write enable signal for said memory, wherein said protected write enable signal is conditionally generated by combining a write enable signal, in particular by using an AND function, with an associated write allowance register output signal; and wherein said memory operates in response to said protected write enable signal for avoiding storing into said memory invalid or unintended address values or pointers accidentally available on said common address bus; and further comprising a 1-bit write allowance register which is set and reset by a dedicated CPU command and which provides said write allowance register output signal.

6. Apparatus according to claim 4, further comprising a 1-bit write allowance register which is set and reset by a dedicated CPU command and which provides said write allowance register output signal.

* * * * *